G. R. WILLMOT.
Horse-Tail Protectors.
No. 158,558. Patented Jan. 5, 1875.
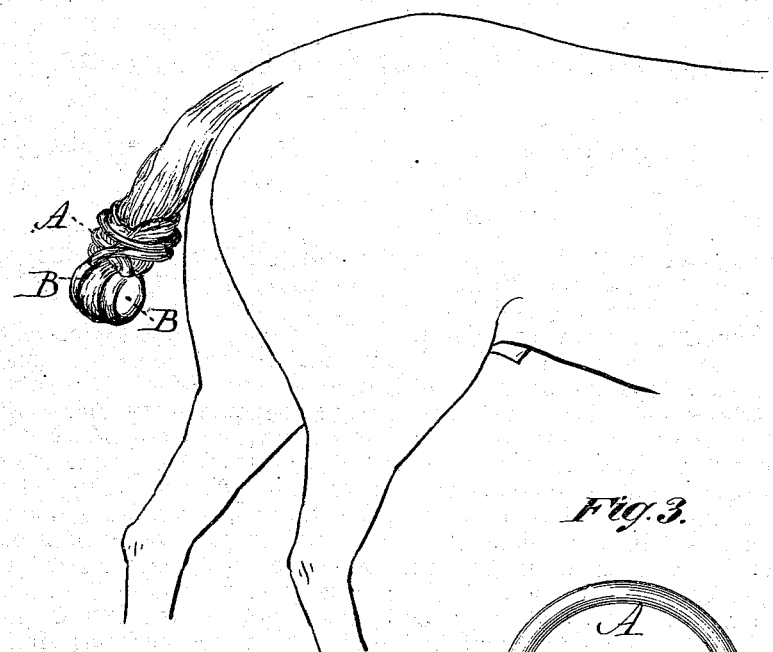
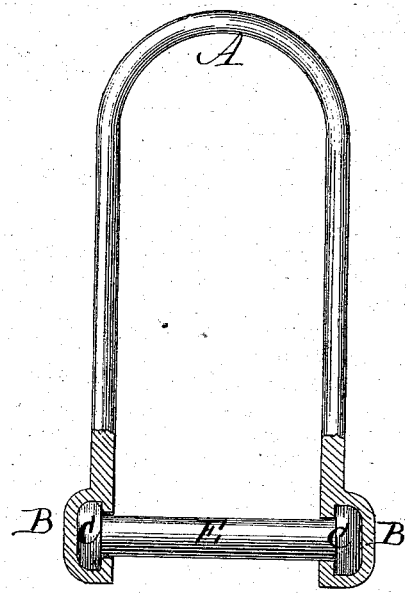
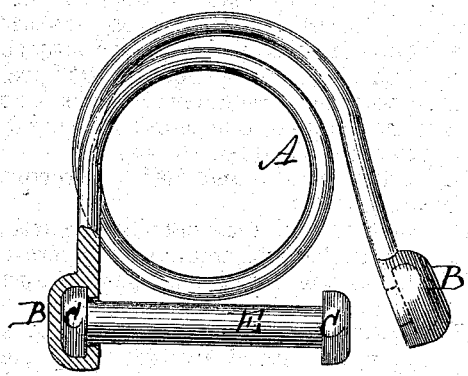

UNITED STATES PATENT OFFICE.

GEORGE R. WILLMOT, OF WEST MERIDEN, CONNECTICUT.

IMPROVEMENT IN HORSE-TAIL PROTECTORS.

Specification forming part of Letters Patent No. 158,558, dated January 5, 1875; application filed December 23, 1874.

*To all whom it may concern:*

Be it known that I, GEORGE R. WILLMOT, of West Meriden, in the county of New Haven and State of Connecticut, have invented an Improved Horse-Tail Protector; and I do hereby declare that the following is a full, clear, and exact description of the same, reference being had to the accompanying drawing, forming part of this specification.

My invention consists in the combination of a bar or shaft, around which the hair of the tail is passed, and an elastic band, strap, or cord adapted to be attached to said bar and passed around the tail, for the purpose of holding the hair in place when wrapped or twisted around the dock, to protect it from mud and dirt. The invention consists, further, in a novel mode of connecting the ends of the elastic band with the bar or shaft, whereby they may be readily attached to or detached from each other.

In the accompanying drawing, Figure 1 is a perspective view, showing the application of my invention to a horse's tail. Fig. 2 is a detail view, showing the protector in one position. Fig. 3 is a similar view, showing the protector in another position.

A represents a band of rubber, or other suitable elastic material, of sufficient length to enable it to be passed a number of times around the tail. At the ends of the band are cups or sockets B, which, when made of rubber, are molded in one piece with the band. The sockets B correspond in form and size with two heads or buttons, C, formed on the ends of a short bar or shaft, E, which may be made of wood, metal, or any other suitable material. The outer sides of the heads are rounded, and the inner sides are flat, with angular edges. The sockets B fit the heads sufficiently tight to prevent their accidental displacement, but may be readily made to engage or disengage after the manner of an ordinary button and button-hole, owing to the elasticity of the socket.

In using the protector one end of the band is detached, and the bar or shaft E is placed at about the end of the dock, and the hair turned or doubled over the shaft and wrapped one or more times around the dock. The band A is then wrapped around the tail above the shaft E a sufficient number of times to hold the hair in place, and the end of the band is fastened by placing the other socket over the other head, thus securing the hair of the tail in the position shown in Fig. 1, in which position it is protected from mud and dirt without the necessity of inclosing it in a bag, cloth, or other wrapping.

The mode of attaching the band and bar need not be limited to the exact shape shown in the drawing, as the form and arrangement may be varied in any manner that will accomplish the desired object. The bar or shaft may be tubular in form, and the band may be provided with plugs fitting therein; but I prefer the construction hereinabove described, as the sockets not only serve to connect the band, but also protect the ends of the bar.

What I claim as new, and desire to secure by Letters Patent, is—

1. The combination of the bar E and elastic band A, constructed and arranged to operate substantially as and for the purpose shown and described.

2. The combination of the heads or buttons C and cups or sockets B, for attaching the band to the bar, substantially as shown and described.

GEORGE R. WILLMOT.

Witnesses:
EDWIN BIRDSEY,
GEO. W. SMITH.